June 19, 1956      H. S. COLE      2,751,489

ILLUMINATED TACKLE BOX

Filed May 29, 1953      2 Sheets-Sheet 1

INVENTOR
Herman S. Cole

BY Lancaster, Allwine & Rommel
ATTORNEYS

June 19, 1956  H. S. COLE  2,751,489
ILLUMINATED TACKLE BOX
Filed May 29, 1953  2 Sheets-Sheet 2
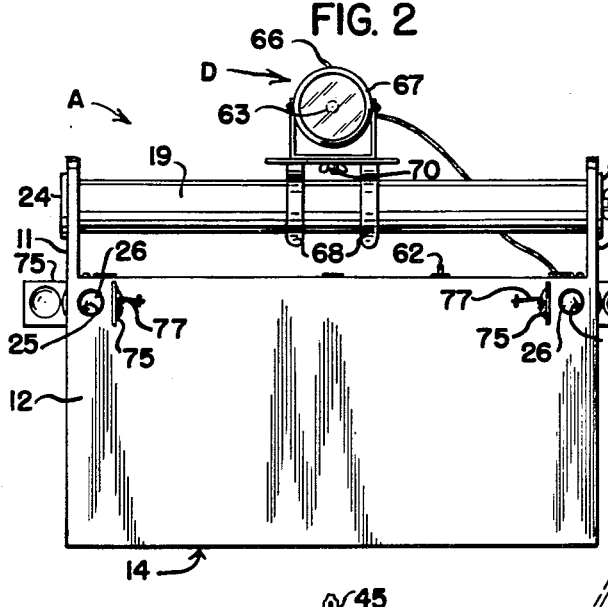
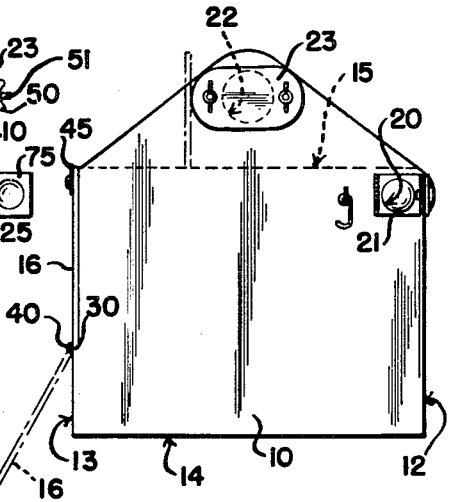
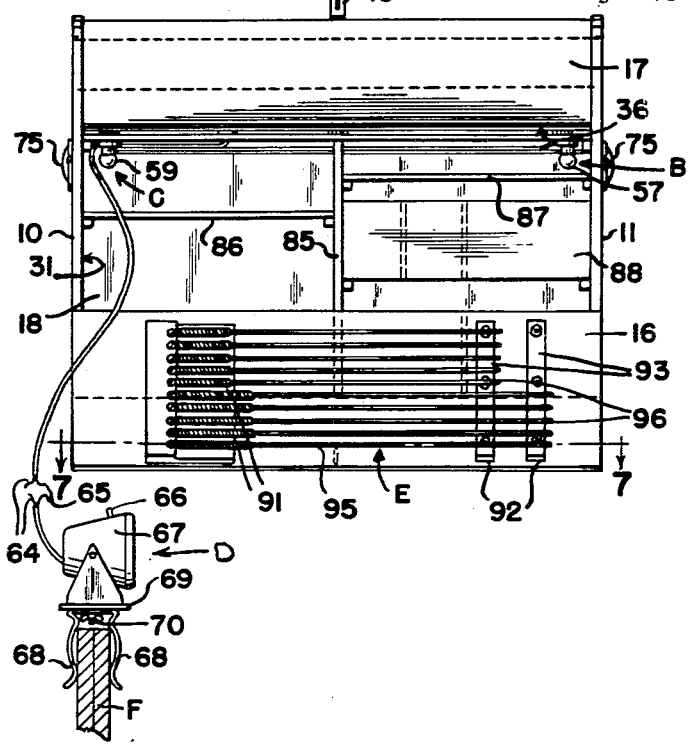
INVENTOR
Herman S. Cole
ATTORNEYS

United States Patent Office 2,751,489
Patented June 19, 1956

2,751,489

ILLUMINATED TACKLE BOX

Herman S. Cole, Silver Spring, Md.

Application May 29, 1953, Serial No. 358,436

2 Claims. (Cl. 240—6.4)

This invention relates to fishing. More specifically, it relates to a plural-purpose illuminated tackle box and support for navigation lights.

An important object of the invention is to provide a box or portable container for fishing tackle and allied small equipment wherein the contents is quickly available yet protected against rain, spray, sleet and the like.

Another important object is to provide such a box into which a hand may be inserted from the top or side or, if a larger opening is desired, in order to remove articles which will not pass through either the top or side openings, or so that the contents of the box may be more widely inspected, the merging top and side openings will permit such removal or inspection.

A further important object is to provide an illuminated tackle box, in which provision is made for the electrical illumination of the interior and the same illumination provides for the conventional red and green (or any special) navigation lights.

Furthermore, an important object is to provide a combined dirigible electric light which, when not in use, is housed in the box but may be employed, when mounted as provided for in this disclosure, as a white-light navigation or running light. This same light may also be used as a hand lamp and electric current is preferably supplied by a source of electricity carried by the box.

Additionally, an important object is to provide a portable illuminated tackle box in which the hollow handle of the box contains the source of electricity, such as primary batteries.

Another object is to provide a tackle box having a cover or lid portion which also provides a fish hook holder.

Other objects and advantages of the invention will be apparent during the course of the following detailed description of the invention, taken in connection with the accompanying drawings, forming a portion of this disclosure, and in which drawings:

Fig. 2 is a side elevation thereof with navigation lights including a dirigible light, showing.

Fig. 3 is an end elevation thereof with the dirigible light removed.

Fig. 4 is a side elevation of the box in an opened condition and the dirigible light removably secured to a portion of a boat.

Figure 1:
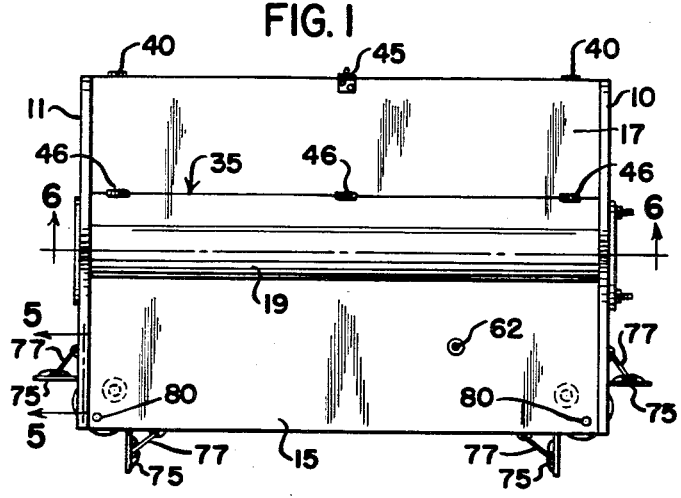
Fig. 1 is a top plan of the box.

In the drawings, wherein for the purpose of illustration is shown a preferred embodiment of the invention and wherein similar reference characters designate corresponding parts throughout the several views, the illuminated tackle box and support for navigation lights is designated as A, the navigation lights as B and C, the combined portable and navigation light as D, fishing tackle as E and a support F, such as a portion of a boat.

The box and support A includes upwardly-extending end walls 10 and 11, and side walls 12 and 13, bottom wall 14, top wall 15 and lids or closures 16 and 17, all defining a compartment 18. The box and support A also includes a handle 19.

Referring mainly to Figs. 3 and 4, the end walls 10 and 11 are preferably substantially alike in that each extends upwardly from the bottom wall 14 and beyond the top wall 15 where the edges of the walls 10 and 11 may converge as in the wall 10 shown in Fig. 3. Each wall 10 and 11 is provided with a port or opening 20, preferably circular to contain a lens 21. These ports 20 are closely adjacent the side wall 12 and top wall 15. In addition, the walls 10 and 11 contain an opening 22 therethrough adjacent the juncture of the converging edges thereof referred to above and closed, at its outer mouth, by a suitable closure 23, in the case of the wall 10 and shown in Figs. 3 and 6, and a closure 24 in the case of the wall 11. The openings 22 communicate with the interior of the hollow handle 19 of the box A and will be referred to again.

The side wall 12, shown in Fig. 2, extends from the bottom wall 14 to the top wall 15 and is provided with two ports 25 preferably like the ports 20 and disposed closely adjacent the latter. Lenses 26 are provided for these ports 25.

As for the opposite side wall 13, this wall extends upwardly from the bottom wall 14 but its upper edge 30 falls short of the horizontal plane of the top wall 15, as may be appreciated in Fig. 3, whereby an opening 31 as in Fig. 4 is provided leading to the compartment 18.

Preferably the bottom wall 14 is imperforate and the top wall 15, as in Fig. 1, extends from one side wall, as the wall 12, toward the vertical plane of wall 13 but the inner edge 35 of the former falls short of this vertical plane, whereby an opening 36, extending from the edge 35 and the end walls 10 and 11, is provided and which opening 36 extends to the opening 31, thus increasing the available opening into the compartment 18. It will be noted in Fig. 1 that the top wall 15 extends over an area exceeding one-half the area of the top of the box A, not only so that there will not be too large an opening which would permit rain, sleet, etc. to enter the compartment 18, but so that the closure or lid 17 will clear the handle of the box A as it is being initially raised.

Figure 7:
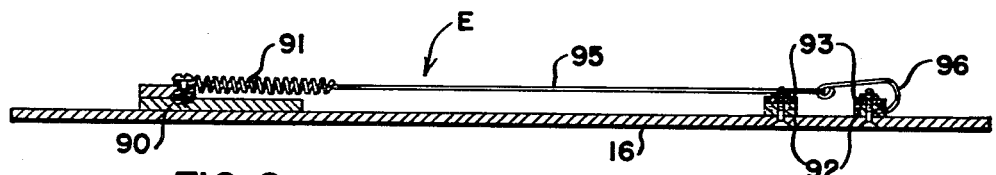
Fig. 7 is a fragmentary vertical section through a cover or lid of the box supporting a fish hook and leader rack.
Figure 8:
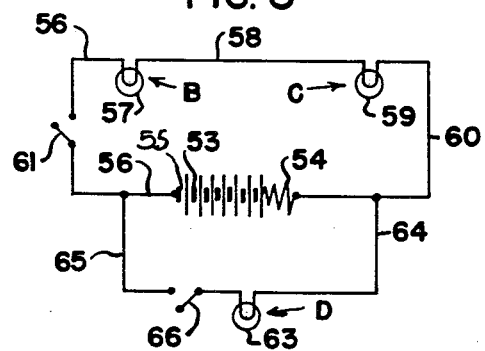
Fig. 8 is an electrical wiring diagram of the electrical portions of the box.

Referring mainly to Figs. 3, 4 and 7, the lid or closure 16 is adapted to close the opening 31 and additionally functions as a support for fishing tackle E, as will be later detailed. The lid or closure 16 extends from the edge 30, where it may be hinged to the wall 12 as by suitable conventional leaf hinges 40.

As in Fig. 1, the lid or closure 17 extends to the vertical plane of the outer face of the closure 16 and a suitable conventional securing means 45 may be provided, carried partly by the lid 16 and partly by the lid 17, to secure the two lids together and thus close the openings 31 and 36. The means 45 may be conventional hasp means. The lid 17 may be hinged to the top wall 15 as by conventional leaf hinges 46.

Figure 6:
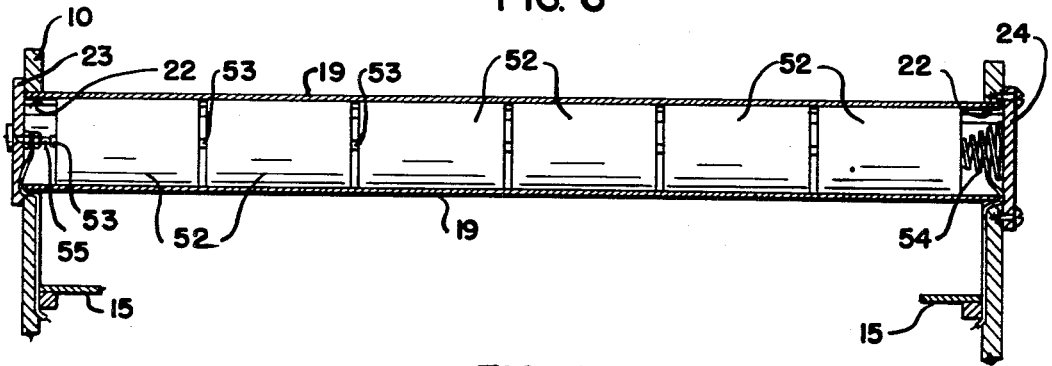
Fig. 6 is an enlarged vertical section through the handle of the box, substantially on the line 6—6 of Fig. 1.

The plural-function handle 19, shown in Figs. 1, 2 and 6, is preferably a cylinder of suitable dielectric material, stout enough to support the walls 10 to 15, closures 16 and 17 and contents of the box A, and the end portions of the handle 19 extend into the openings 22. One end portion abuts the removable closure 23 and the other end portion abuts the closure 24, as may be seen in Fig. 6. In order to render the closure 23 removable, it may be secured to the end wall 10 as by thumb nuts 50 to engage the outer end portions of screw threaded shanks 51 extending outward from the wall 10 and through suitable openings through the closure 23. The handle 19 contains a suitable source of energy, such as a plurality of conventional primary or dry cells 52 disposed end-to-end with the terminals 53 of all but the cell 52 nearest the closure 23 in electrical contact with the cell ahead. A helical expansion spring 54 may be employed to assist in making contact of cell with cell and also to urge the terminal 53 of the outermost cell 52 in contact with an electrical terminal 55 carried upon the inner face of the closure 23. Preferably, the entire closure 23 is of dielectric material.

In addition to the electrical means heretofore disclosed, there is provided an insulated conductor 56 in electrical contact with the terminal 55 and extending to one terminal of a conventional electric lamp 57 of the light B disposed within the compartment 18 (as by being carried by the top wall 15) adjacent a nearby port 20 and 25. From the other terminal of the lamp 57 a lead 58 extends to one terminal of another conventional electric lamp 59 of the light C, disposed within the compartment 18 and preferably carried by the top wall 15 adjacent the other two nearby ports 20 and 25. Thus, the lamps 57 and 59 are adapted to illuminate the compartment 18 and some of their rays shine through the ports 20 and 25 and the lenses carried therein. From the other terminal of the lamp 59 an insulated conductor 60 extends to the spring 54 which thus functions as a terminal. Midway the ends of the lead 56 may be interposed a conventional electric switch 61 with its actuator 62 extending through the wall 15. Additional wiring comprises a lead 65 from the conductor 56 to one terminal of the electric lamp 63 of the light D and from the other terminal thereof a lead 64 extends to the conductor 60. A suitable electric switch 66 is interposed in the lead 65 and carried by the housing 67 of the light D. This housing 67 is provided with means to detachably secure the portable light D to the handle 19 or to any suitable above-water portion F of a boat, such as a gunwale, as in Fig. 4. This means as in Fig. 4 may be two pairs of resilient arms 68 forming a clip and secured to a support 69 which is, in turn, secured to the housing 67. When the portable light D is mounted upon the handle 19, as in Fig. 2, midway the ends of the handle and with the rays extending forward, it functions as the white-light running or navigation light and is thus disposed above the lights B and C, but it may also be employed to illuminate any desired portion of the boat and it and its leads may be housed in the compartment 18 when not in use. Preferably the housing 67 is pivotally mounted upon the support 69, as by pivot 70, so the housing may be manually oriented as desired.

Figure 5:
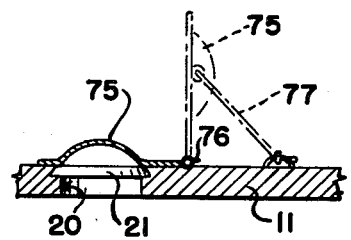
Fig. 5 is a fragmentary enlarged horizontal section of the box substantially on the line 5—5 of Fig. 1 but with the lens of a navigation light covered.

Associated with each port 20 and 25 is a combined closure and screen 75 best shown in Fig. 5. Each is an opaque member, preferably cupped in its central part and rectangular at its edges and adapted to extend over the outer mouth of its associate port but may be swung upon the pivot 76, carried by the wall containing the port, to the dotted position in Fig. 5. In the full line position of the screens 75, as in Fig. 5, it wholly blocks light rays from the nearby lamp and when swung to the dotted position in Fig. 5 or to the full line positions in Fig. 4 of two of the screens 75, the screen are in closed positions while, as shown in full lines in Figs. 1, 2 and 3, the shields function as conventional screen of running lights. In order to retain the shields 75 in their positions as in Figs. 1, 2 and 3, I prefer to provide a contraction spiral spring 77 for each shield with one end of the spring secured to the shield and the other end to an adjacent portion of the end or side wall as the case may be, and with this latter end disposed with the pivot 76 between it and the adjacent shield. In this connection, the lenses of the light B are conventionally green and those of the light C are conventional red.

If desired there may be provided signal means to indicate whether or not the lamps 57 and 59 are lighted. This may be accomplished by providing small holes through the top wall 15 and covering them with red lenses 80.

Of course the interior arrangement of the compartment 18 may vary as is obvious. I may provide a partition 85, shelves 86 and 87, and a compartmented removable tray 88.

With reference to the use of the lid 16 to support tackle E, attention is directed to Figs. 4 and 7 where a support 90 fixedly mounted upon the inner face of the lid 16 adjacent one edge portion of the latter, carries a plurality of spaced apart resilient members, as contraction spiral spring 91 at a like end of each and the springs having hooks at their outer end to which the loop at the free end of a leader 95 may be removably secured. The barbs at the ends of the hooks 96 of tackle E are hooked into or imbedded in selected substantially paralleling strips 92 of cork. Preferably the strips 92 are retained by rigid strips 93 upon their outer faces with rivets or the like securing them to the lid 16. The leaders will be maintained taut by this device and the barbs of the hooks well protected.

The arrangemens disclosed permits either or both lids 16 and 17 to be manipulated in order to ascertain and withdraw the contents of the compartment 18. In the event of inclement weather, if it is desired to employ any of the tackle E disposed upon the inner face of the lid 16, the lid 17 is not disturbed whereby rain, sleet or the like is not apt to find its way into the compartment as readily as if the lid 17 were raised. On the other hand, the lid 17 may be raised until it abuts the handle 19 (which then functions as a stop for the lid 17) and the angler may reach downwardly into the compartment. Of course, as stated, the handle functions as a means to carry the box, to house the batteries 52 and, being substantially the highest point of the box and above the lights B and C, as a support for the white running or navigation light.

It is now obvious that the light D may be employed to add to the illumination of the compartment 18 if desired.

Various changes may be made to the form of the invention herein shown and described without departing from the spirit of the invention or scope of the claims.

What is claimed is:

1. In an illuminated tackle box, walls, including opposite upwardly extending walls, and an upwardly-swinging closure, defining a compartment, a hollow handle bridging said opposite walls, disposed above the horizontal plane of said closure when said closure is in a closed position, and disposed within the path of travel of said closure after said closure is swung to a vertical position, a portable lamp normally disposed within said compartment and provided with means to detachably mount said lamp upon said handle, and electrical energy providing means carried within said hollow handle to supply electrical energy to illuminate said lamp.

2. In an illuminated tackle box, walls, including opposite upwardly extending walls, and an upwardly-swinging closure, defining a compartment, one of said upwardly-extending walls being provided with a port at its upper end portion, a hollow handle bridging said opposite walls, disposed above the horizontal plane of said closure when said closure is in a closed position, and disposed within the path of travel of said closure after said closure is swung to a vertical position, said hollow handle opening to said port, a movable closure for said port, a portable lamp normally disposed within said compartment and provided with means to detachably mount said lamp upon said handle, and electrical energy providing means carried within said hollow handle to supply electrical energy to illuminate said lamp.

(References on following page)

References Cited in the file of this patent

UNITED STATES PATENTS

| | | | |
|---|---|---|---|
| 513,044 | Handlan | Jan. 16, | 1894 |
| 1,218,162 | Becker | Mar. 6, | 1917 |
| 1,984,228 | Morhous | Dec. 11, | 1934 |
| 2,021,015 | Muller | Nov. 12, | 1935 |
| 2,069,661 | Tiede | Feb. 2, | 1937 |
| 2,082,857 | Thoroughgood et al. | June 8, | 1937 |
| 2,137,881 | Margulies | Nov. 22, | 1938 |
| 2,207,017 | Lemerman | July 9, | 1940 |
| 2,290,419 | Dunn | July 21, | 1942 |
| 2,334,084 | Gold | Nov. 9, | 1943 |
| 2,517,914 | Nowaczek | Aug. 8, | 1950 |
| 2,554,603 | Terlinde | May 29, | 1951 |
| 2,558,124 | Burden | June 26, | 1951 |
| 2,684,476 | Trempe | July 20, | 1954 |
| 2,691,091 | Straeter | Oct. 5, | 1954 |

FOREIGN PATENTS

| | | | |
|---|---|---|---|
| 116,830 | Great Britain | June 27, | 1918 |